United States Patent
Coleman

[11] Patent Number: 5,852,509
[45] Date of Patent: *Dec. 22, 1998

[54] CONDUCTIVE FONT

[75] Inventor: James P. Coleman, St. Louis, Mo.

[73] Assignee: Monsanto Company, St. Louis, Mo.

[*] Notice: This patent issued on a continued prosecution application filed under 37 CFR 1.53(d), and is subject to the twenty year patent term provisions of 35 U.S.C. 154(a)(2).

[21] Appl. No.: 827,519

[22] Filed: Mar. 28, 1997

Related U.S. Application Data

[63] Continuation of Ser. No. 437,757, May 9, 1995, abandoned.

[51] Int. Cl.$^6$ .................................................. G02F 1/153
[52] U.S. Cl. ............................................................ 359/271
[58] Field of Search .................................... 359/265, 266, 359/271; 349/141, 142

[56] References Cited

U.S. PATENT DOCUMENTS

| | | | |
|---|---|---|---|
| 3,500,392 | 3/1970 | Maljuk | 340/381 |
| 3,674,342 | 7/1972 | Castellano et al. | 350/160 R |
| 3,807,831 | 4/1974 | Soref | 350/150 |
| 3,903,519 | 9/1975 | Zega | 340/378 R |
| 3,925,977 | 12/1975 | Maezawa | 58/4 A |
| 3,978,007 | 8/1976 | Giglia et al. | 252/506 |
| 3,981,559 | 9/1976 | Channin | 350/160 LC |
| 4,116,544 | 9/1978 | Soref | 350/336 |
| 4,153,344 | 5/1979 | Hamada et al. | 350/357 |
| 4,160,241 | 7/1979 | Shimizu et al. | 340/763 |
| 4,256,380 | 3/1981 | Barclay et al. | 350/357 |
| 4,280,754 | 7/1981 | Yano et al. | 350/357 |
| 4,309,699 | 1/1982 | Tauer | 340/715 |
| 4,333,710 | 6/1982 | Duchene | 350/357 |
| 4,342,031 | 7/1982 | Lapeyre | 340/756 |
| 4,345,249 | 8/1982 | Togashi | 340/784 |
| 4,416,516 | 11/1983 | Beni et al. | 350/357 |
| 4,550,982 | 11/1985 | Hirai | 350/357 |
| 4,750,817 | 6/1988 | Sammells | 350/357 |
| 4,850,684 | 7/1989 | Inaba et al. | 359/271 |
| 4,922,242 | 5/1990 | Parker | 340/786 |
| 5,080,470 | 1/1992 | Warszawski | 359/265 |
| 5,082,355 | 1/1992 | Warszawski | 359/265 |
| 5,189,594 | 2/1993 | Leventis et al. | 359/271 |
| 5,413,739 | 5/1995 | Coleman | 252/511 |
| 5,548,421 | 8/1996 | Miyazaki | 359/54 |
| 5,576,867 | 11/1996 | Baur et al. | 359/87 |
| 5,600,464 | 2/1997 | Ohe et al. | 349/123 |

FOREIGN PATENT DOCUMENTS

| | | |
|---|---|---|
| 0086551 | 8/1983 | European Pat. Off. ......... G09G 3/04 |
| 193 978 | 9/1986 | European Pat. Off. . |
| 59-113422 | 6/1984 | Japan . |
| 60-99174 | 6/1985 | Japan . |
| 61-185730 | 8/1986 | Japan . |
| 62-049333 | 4/1987 | Japan . |
| 63-207856 | 8/1988 | Japan . |
| 577 179 | 6/1976 | Switzerland ...................... G02F 1/13 |
| 627 041 G | 12/1981 | Switzerland . |
| 94/15246 | 7/1994 | WIPO . |
| WO 96/36956 | 11/1996 | WIPO . |

OTHER PUBLICATIONS

Nomura et al., *Electrochemical and Electrochromic Properties of Polymer Complex Films Composed of Polytetramethylenviologen and Poly–[p–Styrenesulfonic acid] Containing a Conductive Powder*, pp. 593–608, J. Macromol. Sci–Chem., A26 (2 & 3) (1989).

Masumi et al., *Response–Improved Electrochromic Display Based On Organic Materials*, pp. 245–248, Proc. of the SID, vol. 23/4, (1982).

*Primary Examiner*—Georgia Epps
*Assistant Examiner*—Dawn-Marie Bey
*Attorney, Agent, or Firm*—Howell & Haferkamp, L.C.

[57] ABSTRACT

A font for generating interconnected alphanumeric electrode characters adapted for use as an image-generating electrode in flat displays such as electrochromic displays. A display message comprising characters of such font be readily applied to flat display films by printers, e.g. ink jet or laser jet printers, capable of applying electrically conductive ink. The characters in the font are defined by two generally parallel and spaced apart lines where a wide first line has apertures defining the general shape of the character and a second narrow line having curvilinear or segmented portions extending into the aperture of said first line.

43 Claims, 1 Drawing Sheet

CONDUCTIVE FONT

This application is a continuation of Ser. No. 08/437,757, filed May 9, 1995 now abandoned.

Disclosed herein are conductive fonts for electrically activated displays and methods of making and using such fonts.

BACKGROUND OF THE INVENTION

Electrically activated displays include thermochromic, electrochromic, electroluminescent and electrochemiluminescent displays, e.g. as disclosed in U.S. Pat. Nos. 5,080,470; 5,189,549 and 5,413,739. Display patterns can be generated by applying an activatable chromic material over an underlying electrically conductive pattern or activatable matrix. In the case of thermochromic displays, heat generated by electrical current passing through the conductor activates the chromic layer. In the case of electrochromic, electroluminescent and electrochemiluminescent displays, a sandwich-type electrode configuration is typically employed where at least one electrode, typically the display face electrode is typically transparent, e.g. a conductive metal oxide such as indium tin oxide, and the display pattern is defined by the geometry of either electrode. U.S. Pat. No. 5,189,549 discloses sandwich-type geometric configurations for display electrodes and U.S. Pat. No. 5,413,739 discloses side-by-side geometric configurations for display electrodes. A disadvantage of displays of the prior art is that the geometric patterns for electrodes are typically produced by tedious or expensive methods such as one or more repetitive steps of painting or printing a conductive patterns or activatable matrices of conductive ink or by electroless deposition through a patterned mask.

The disadvantages of these prior electrode fabricating techniques are avoided by use of the character font of this invention which can readily be set into a printer adaptable to receiving computer generated text. The pattern can be printed by using an electrically conductive ink or a catalytic ink for electroless deposition of a conductive metal such as copper or nickel.

SUMMARY OF THE INVENTION

This invention provides a font for generating interconnected alphanumeric electrode characters adapted for use as an image-generating electrode in flat displays such as electrochromic displays. A display message comprising characters of such font can be readily applied to flat display films by printers, e.g. ink jet or laser jet printers, capable of applying electrically conductive ink. Each of the characters in the font is defined by two generally parallel and spaced apart lines where a wide first line has apertures defining the general shape of the characters and a second narrow line has curvilinear or segmented, but continuous, extensions into the aperture of said first line.

DETAILED DESCRIPTION OF PREFERRED EMBODIMENTS

Figure 1:
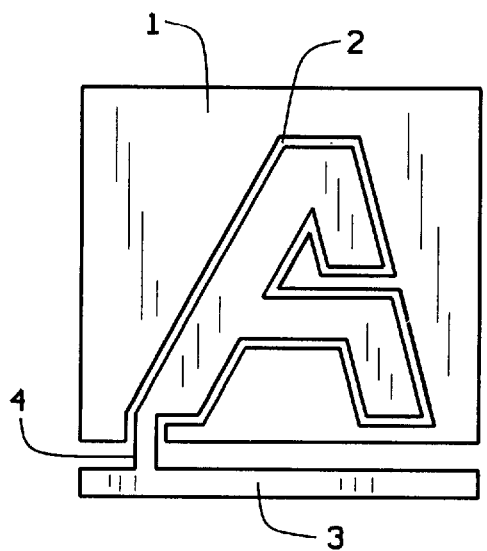
FIG. 1 illustrates a character in a font according to this invention.
Figure 2:
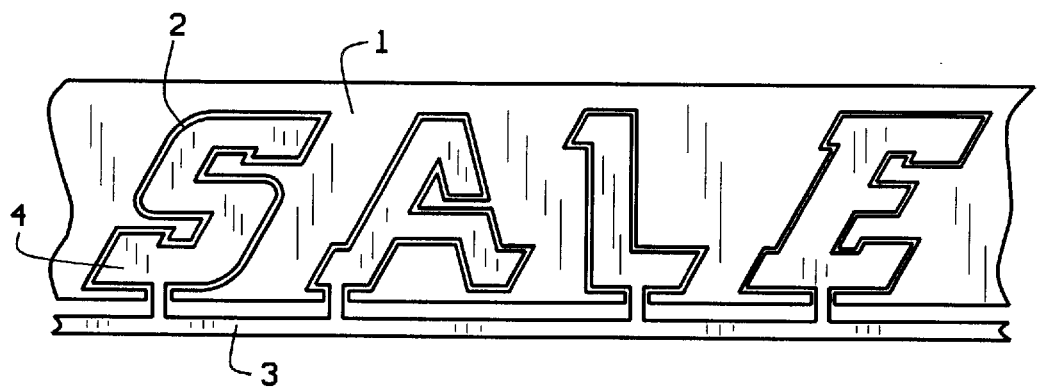
FIG. 2 illustrates the use of the font of this invention in a script for a display message.

The font of alphanumeric characters provided by this invention provides character images that are adapted to be printed by electrically conductive ink into a message pattern of electrically interconnected characters defined by a first wide line defining the exterior edge of a character and having an aperture within the interior of said character and a second line having curvilinear or segmented, but continuous, extensions passing through said aperture wherein said lines extend parallel from both sides of character allowing interconnection with first and second lines, respectively, of adjoining characters. With reference to FIG. 1 there is shown a font according to this invention for the capital letter "A" where wide line 1 has an aperture 3 defining the outline of the letter. Parallel line 3 has an extension segment 4 extending into the aperture 2. Parallel lines 1 and 3 extend beyond the width of the character allowing electrical interconnection with adjoining characters as illustrated in FIG. 2.

When printed with an electrically conductive ink, e.g. a common silver ink or carbon ink, the lines of the font of this invention provide electrodes for use in an electrochromic display. The portion of line 3 lying outside of the aperture defining the character can be covered with an insulating material by printing electrical insulating ink or similar coating to advantageously mask the outline of that portion of line 3 which lies outside the area of the character. The area of the aperture 2 can, if needed, be coated with an insulating material to separate the electrodes. A layer of electrochromic material, e.g. electrochromic particles in an ionically isolative polymer matrix as disclosed in U.S. Pat. No. 5,413,739, can be applied to overlap the area of the printed electrodes. When applied to a series of adjoining characters the overlapping electrochromic layer will typically extend over the general extended area of a plurality of lines 1 in a sequence of printed characters. The electrochromic layer can be coated with an electrolyte layer to provide an electrochromic display. Such a display can be activated by applying a voltage across lines 1 and 3 providing activation of an electrochromic image corresponding to the characters defined by the apertures in the extended line 1.

For generating display information the fonts of this invention are preferably alphanumeric characters. In such characters first line has a width about the height of symbols in said font, extending close to but not intersecting the path of the second line. In addition to alphanumeric characters the font preferably comprises punctuation marks, symbols such as smiles, hearts, arrows and the like and spacers. In this regard a spacer character can comprise parallel lines for interconnecting first and second lines extending between spaced apart characters. In FIG. 2, the character "A" is shown with no electrical connection to the enclosed area in the upper part of the letter. In this embodiment, the enclosed area can be covered with a pigmented insulating coating having a color similar to that of the area outside of the letters when the the display is activated.

The font of this invention can be advantageously used in manufacturing flat screen electrochromic display devices by printing the display image, e.g. an alphanumeric message, using conventional conductive ink printing techniques, e.g. ink jet printing or flexographic printing onto an insulating sheet such as polyester or polyimide film.

While specific embodiments have been described herein, it should be apparent to those skilled in the art that various modifications thereof can be made without departing from the true spirit and scope of the invention. Accordingly, it is intended that the following claims cover all such modifications within the full inventive concept.

I claim:

1. A electrochromic display comprising:

two electrically continuous electrodes printed on a single side of an insulating film, the electrochromic display having alphanumeric characters corresponding to apertures in a first one of the two electrically continuous electrodes; and means for applying a voltage across the two electrically continuous electrodes to activate the alphanumeric characters comprising an electrochromic image.

2. A flat electrochromic display comprising:

(a) an insulating film;

(b) a first and a second conductive electrode spaced apart from one another and printed on a surface of the insulating film, the first conductive electrode comprising a line having apertures therein each defining an outline of an alphanumeric character, and the second electrode being parallel to the first and having extension segments into said apertures, the extension segments being formed within said apertures in corresponding shapes of said alphanumeric characters;

(c) a layer of electrochromic material overlapping the area of the printed electrodes;

(d) an electrolytic layer over the electrochromic material; and (e) a region having no electrical connection wherein said region is covered with a pigmented insulating coating and enclosed within an aperture, wherein application of voltage across the first and the second conductive electrodes activates an electrochromic image corresponding to the characters defined by said apertures in the first conductive electrode.

3. The display of claim 2 wherein the insulating film is selected from the group consisting of polyester and polyimide films.

4. The display of claim 2 wherein the electrochromic material comprises electrochromic particles in an ionically isolative polymer matrix.

5. The display of claim 3 and further comprising an insulating coating within the apertures to separate the first and the second conductive electrodes.

6. The display of claim 2 wherein the first and second conductive electrodes comprise an ink selected from the group consisting of silver ink and carbon ink.

7. The display of claim 6, wherein the pigmented insulating coating has a color similar to that of an activated region of the display.

8. A method of making an electrochromic display comprising the steps of:

(a) printing, on an insulating sheet, electrically conductive ink in a pattern comprising a pair of lines, a first line of the pair of lines including an aperture therein defining exterior edges of an alphanumeric character, and a second line of the pair of lines parallel to the first line and which has extensions into the apertures;

(b) repeating the printing step to form a display message comprising a plurality of adjoining alphanumeric characters in which the respective first lines and second lines of the adjoining alphanumeric characters are electrically connected so as to form a first electrode and a second electrode, respectively;

(c) overlapping a layer of electrochromic material over the area of the printed electrodes; and (d) coating the layer of electrochromic material with an electrolyte layer to thereby form an electrochromic display having alphanumeric characters activated by applying a voltage across the first electrode and the second electrode.

9. The method of claim 8 and further comprising the step of coating areas of the apertures with an insulating material to separate the first electrode and the second electrode.

10. The method of claim 8 and further comprising the step of covering a portion of an aperture having no electrical connection with a pigmented insulating coating having a color similar to that of an activated portion of the display.

11. The method of claim 10 and further comprising the step of coating areas of the apertures with an insulating material to separate the first electrode and the second electrode.

12. The method of claim 8 and further comprising means connected across the first electrode and the second electrode for activating the electrochromic display.

13. A flat electrochromic display comprising:

(a) an insulating film;

(b) a first and a second conductive electrode laterally disposed in spaced-apart relationship to one another and printed on a surface of the insulating film, the first conductive electrode comprising a line having apertures therein each defining an outline of an alphanumeric character, and the second electrode being parallel to the first and having extension segments into said apertures, the extension segments being formed within said apertures in corresponding shapes of said alphanumeric characters;

(c) a layer of electrochromic material overlapping the area of the printed electrodes;

(d) an electrolytic layer over the electrochromic material; and (e) means for applying an electric current between the first and second conductive electrodes to activate an electrochromic image corresponding to the characters defined by said apertures in the first conductive electrode.

14. The display of claim 13 wherein the insulating film is selected from the group consisting of polyester and polyimide films.

15. The display of claim 13 wherein the electrochromic material comprises electrochromic particles in an ionically isolative polymer matrix.

16. The display of claim 13 and further comprising an insulating coating within the apertures to separate the first and the second conductive electrodes.

17. The display of claim 13 wherein the first conductive electrode and the second conductive electrode comprise an ink selected from the group consisting of silver ink and carbon ink.

18. The display of claim 13 and further comprising a region having no electrical connection that is covered with a pigmented insulating coating and enclosed within an aperture.

19. The display of claim 18 wherein the pigmented insulating coating has a color similar to that of an activated region of the display.

20. A flat electrochromic display consisting essentially of:

(a) an insulating film;

(b) a first and a second conductive electrode spaced apart from one another and printed on a surface of the insulating film, the first conductive electrode comprising a line having apertures therein each defining an outline of an alphanumeric character, and the second electrode being parallel to the first and having extension segments into said apertures, the extension segments being formed within said apertures in corresponding shapes of said alphanumeric characters;

(c) a layer of electrochromic material overlapping the area of the printed electrodes; and (d) an electrolytic layer over the electrochromic material;

wherein the application of voltage across the first and second conductive electrode activates an electrochromic image corresponding to the characters defined by said apertures in the first conductive electrode.

21. The display of claim 20 wherein the insulating film is selected from the group consisting of polyester and polyamide films.

22. The display of claim 20 wherein the electrochromic material comprises electrochromic particles in an ionically isolative polymer matrix.

23. The display of claim 20 and further comprising an insulating coating within the apertures to separate the first and the second conductive electrodes.

24. The display of claim 20 wherein the first and second conductive electrodes comprise an ink selected from the group consisting of silver ink and carbon ink.

25. The display of claim 20, and further comprising a region having no electrical connection that is covered with a pigmented insulating coating and enclosed within an aperture.

26. The display of claim 25, wherein the pigmented insulating coating has a color similar to that of an activated region of the display.

27. A electrochromic display consisting essentially of two electrically continuous electrodes printed on a side of an insulating film, the electrochromic display having alphanumeric characters corresponding to apertures in a first one of the two electrically continuous electrodes, the alphanumeric characters comprising an electrochromic image that is activated when a voltage is applied across the two electrically continuous electrodes.

28. A flat electrochromic display comprising:

(a) an insulating film;

(b) a first and a second conductive electrode, adapted to operate as working and counter electrodes in conjunction with one another, spaced apart from one another and printed on a surface of the insulating film, the first conductive electrode comprising a line having apertures therein each defining an outline of an alphanumeric character, and the second electrode being parallel to the first and having extension segments into said apertures, the extension segments being formed within said apertures in corresponding shapes of said alphanumeric characters;

(c) a layer of electrochromic material overlapping the area of the printed electrodes; and (d) an electrolytic layer over the electrochromic material;

wherein the application of voltage across the first and second conductive electrode activates an electrochromic image corresponding to the characters defined by said apertures in the first conductive electrode.

29. The display of claim 28 wherein the insulating film is selected from the group consisting of polyester and polyamide films.

30. The display of claim 28 wherein the electrochromic material comprises electrochromic particles in an ionically isolative polymer matrix.

31. The display of claim 28 and further comprising an insulating coating within the apertures to separate the first and the second conductive electrodes.

32. The display of claim 28 wherein the first and second conductive electrodes comprise an ink selected from the group consisting of silver ink and carbon ink.

33. The display of claim 28, and further comprising a region having no electrical connection that is covered with a pigmented insulating coating and enclosed within an aperture.

34. The display of claim 33, wherein the pigmented insulating coating has a color similar to that of an activated region of the display.

35. A electrochromic display comprising two electrically continuous electrodes adapted to operate as working and counter electrodes in conjunction with one another and printed on a side of an insulating film, the electrochromic display having alphanumeric characters corresponding to apertures in a first one of the two electrically continuous electrodes, the alphanumeric characters comprising an electrochromic image that is activated when a voltage is applied across the two electrically continuous electrodes.

36. A flat electrochromic display comprising:

(a) an insulating film;

(b) at least a first and a second conductive electrode, all of the electrodes being spaced apart from one another and printed on no more than a single surface of the insulating film, the first conductive electrode comprising a line having apertures therein each defining an outline of an alphanumeric character, and the second electrode being parallel to the first and having extension segments into said apertures, the extension segments being formed within said apertures in corresponding shapes of said alphanumeric characters;

(c) a layer of electrochromic material overlapping the area of the printed electrodes; and (d) an electrolytic layer over the electrochromic material;

wherein the application of voltage across the first and second conductive electrode activates an electrochromic image corresponding to the characters defined by said apertures in the first conductive electrode.

37. The display of claim 36 wherein the insulating film is selected from the group consisting of polyester and polyamide films.

38. The display of claim 36 wherein the electrochromic material comprises electrochromic particles in an ionically isolative polymer matrix.

39. The display of claim 36 and further comprising an insulating coating within the apertures to separate the first and the second conductive electrodes.

40. The display of claim 36 wherein the first and second conductive electrodes comprise an ink selected from the group consisting of silver ink and carbon ink.

41. The display of claim 36, and further comprising a region having no electrical connection that is covered with a pigmented insulating coating and enclosed within an aperture.

42. The display of claim 41, wherein the pigmented insulating coating has a color similar to that of an activated region of the display.

43. A electrochromic display comprising at least two electrically continuous electrodes, all of the electrodes being printed on a single side of an insulating film, the electrochromic display having alphanumeric characters corresponding to apertures in a first one of the two electrically continuous electrodes, the alphanumeric characters comprising an electrochromic image that is activated when a voltage is applied across the two electrically continuous electrodes.

* * * * *